United States Patent [19]

Stahl et al.

[11] Patent Number: 4,526,484
[45] Date of Patent: Jul. 2, 1985

[54] FERROFLUID THRUST AND RADIAL BEARING ASSEMBLY

[75] Inventors: Philip Stahl, Holliston, Mass.; Dudley D. Fuller, Lake Hill, N.Y.; Harry C. Rippel, Sharon Hill, Pa.

[73] Assignee: Ferrofluidics Corporation, Nashua, N.H.

[21] Appl. No.: 534,415

[22] Filed: Sep. 21, 1983

[51] Int. Cl.³ .............................................. F16C 33/82
[52] U.S. Cl. ...................................... 384/133; 277/80; 384/368; 384/397
[58] Field of Search ................ 384/133, 368, 372, 397, 384/420, 129, 243; 277/80; 308/10

[56] References Cited

U.S. PATENT DOCUMENTS

| | | | |
|---|---|---|---|
| 3,112,964 | 12/1963 | Matthey | 384/243 |
| 3,780,593 | 12/1973 | Coleman et al. | 74/5 R |
| 3,918,773 | 11/1975 | Tuffias | 308/10 |

FOREIGN PATENT DOCUMENTS 1550423 8/1979 United Kingdom .

Primary Examiner—Lenard A. Footland
Attorney, Agent, or Firm—Richard P. Crowley

[57] ABSTRACT

A ferrofluid thrust and radial bearing assembly for a rotatable shaft element, which assembly comprises: a housing characterized by a shaft-receiving space, to define a radial bearing inner surface and a thrust bearing surface at the one end of the shaft-receiving space; a shaft element within the shaft-receiving space, one end of the shaft element disposed to rotate on the thrust bearing surface, and the other end of the shaft extending from the other end of the housing; a ferrolubricant in the shaft-receiving space, to form a lubricant for the thrust bearing and the radial bearing assembly; and a ferrofluid exclusion seal at the other end of the housing and about the other end of the shaft-receiving space, the exclusion seal comprising an annular permanent magnet and at least one annular pole piece, one end of which extends into a close, noncontacting relationship with the exterior surface of the shaft, to form a radial gap, and the ferrofluid within the shaft-receiving space defining a ferrofluid seal at the other end and about the shaft element, so as to retain the ferrofluid within the shaft-receiving space of the housing during the bearing operation.

15 Claims, 2 Drawing Figures

FERROFLUID THRUST AND RADIAL BEARING ASSEMBLY

BACKGROUND OF THE INVENTION

Bearing assemblies are typically employed to provide support for a sliding or rotating movement of an element with minimum friction, and more typically to permit rotation of a rotatable shaft element, such as to provide support of a high-speed spindle, disc-drive shaft for computer magnetic disc operations. Magnetic liquids, more typically known as ferrofluids, have been employed with bearing assemblies for the entrapment of air or gas between a ferrofluid seal, so as to provide for a compressed gas between a rotating spindle and a stator, such as set forth, for example, in U.S. Pat. No. 3,734,578, issued May 22, 1973, and U.S. Pat. No. Re. 27,955, reissued Apr. 2, 1974. Such bearing assemblies disclosed in such patents are designed to be low-torque bearing assemblies, and very little ferrofluid is sheared. Such bearing assemblies are typically employed in movement of instruments and are not designed to withstand very high loads and, therefore, are generally "soft bearing-type" applications which entrap gases and use small amounts of ferrofluid and do not provide for the shearing of the ferrofluid.

Ferrofluids, also called ferrolubricants which exhibit lubricant properties, have been employed also in shearing-type ferrohydrodynamic low-friction-bearing assemblies. For example, U.S. Pat. No. 3,746,407, issued July 17, 1973, discloses a hydrodynamic bearing wherein a ferrofluid is employed both as a seal and as a ferrolubricant, and which bearing assembly includes grooves to provide for a pumping action of the ferrofluid. U.S. Pat. No. 3,726,574, issued Apr. 10, 1973, provides for a ferrohydrodynamic bearing with the use of ferrofluid as a seal, and with compensation means to provide for an adjustment in volume response to temperature. U.S. Pat. No. 3,780,593, issued Dec. 25, 1973, describes a rather complex, magnetic fluid, hydrodynamic bearing which creates a magnetic flux in the vicinity of the bearing, and which employs a ferrofluid and is typically designed for use in a gyroscope. U.S. Pat. No. 3,918,773, issued Nov. 11, 1975, is directed to a ferrofluid thrust bearing employing a ferrofluid seal. U.S. Pat. No. 4,254,961, issued Mar. 10, 1981, also describes a ferrofluid bearing assembly, wherein the ferrofluid is employed as a seal.

It is desirable to provide a ferrofluid thrust and radial bearing assembly particularly for use with precision high-speed shafts, such as in the computer-disc-drive industry or in textile spindles, which bearing assembly is of simple construction, is easily manufactured at low cost and which overcomes some of the disadvantages of the prior-art thrust and radial bearing assemblies.

SUMMARY OF THE INVENTION

The invention relates to a fluid film bearing assembly employing ferrofluid as the lubricant, and in particular to a ferrofluid thrust and radial film bearing assembly particularly suitable for use in precision, high-speed, rotatable shafts, such as in a computer-disc-drive spindle.

The invention comprises a low-cost, simple ferrofluid bearing assembly which may be employed both in low- and high-torque applications, and is particularly useful in precision bearing assemblies for use with small-diameter shafts, both at low or high speed, and particularly is useful for computer-disc-drive-spindle shafts. The ferrofluid bearing assembly employs both a thrust bearing surface and a radial bearing surface, and comprises a housing characterized by a cylindrical shaft-receiving space therein, to define a radial bearing inner surface and a thrust bearing surface at the one end of the shaft-receiving space of the housing, to support the one end of the rotatable shaft. The bearing assembly includes a rotatable, magnetically permeable shaft element which is positioned within the shaft-receiving space of the housing, and which has a shaft diameter which forms a defined, very small clearance between the inner radial bearing surface of the housing and the exterior surface of the shaft. One end of the rotatable shaft is disposed to rotate on or above the ferrofluid film on the thrust bearing surface at the one end of the housing, while the other end of the shaft extends toward and outside of the other end of the housing from the shaft-receiving space. The shaft-receiving space of the housing is designed to be filled with a ferrofluid, typically a ferrolubricant; that is, having both magnetic sealing and lubricating properties, so as to form a reservoir of ferrolubricant during the operation of the shaft in the bearing assembly.

The bearing assembly includes a ferrofluid exclusion seal at the housing, in order to maintain the ferrofluid within the shaft-receiving space in the bearing and to exclude air bubbles or gases from becoming entrained in the ferrofluid during operation. Thus, the ferrofluid exclusion seal at the other end of the housing maintains the ferrolubricant within the cavity and prevents any change in the properties of the ferrolubricant, due to gas entrainment or particulate entrainment from the outside environment. The ferrofluid within the shaft-receiving space thus provides for a thin, radial bearing film along the radial bearing inner surface of the housing and a thrust bearing film at the one end of the housing, which permits the low-friction rotation of the shaft, both under low or high torque or low or high speeds, while the ferrolubricant within the shaft-receiving space is retained in position, to serve as a ferrolubricant reservoir, without any change in properties due to gas entrainment.

In one embodiment of the invention, the bearing assembly is characterized by a generally cylindrical, shaft-receiving space which extends from the thrust surface to the ferrofluid exclusion seal in a close, non-contacting relationship about the exterior surface of the shaft element in the shaft-receiving space, such as, for example, 0.1 to 2 mils, to form an inner radial bearing surface along substantially the length of the rotatable shaft element. In another embodiment, separate upper and lower radial bearing surfaces are formed in the shaft-receiving space with intermediate spaces of greater depth, so as to provide retention of a ferrolubricant in a reservoir. In this embodiment, an upper radial bearing surface is generally formed at the one end near the ferrofluid exclusion seal, while a lower radial bearing surface is formed generally at the other end near and adjacent the thrust bearing surface, with the intermediate surfaces along the longitudinal length of the shaft having a greater radial gap. For example, the upper radial and lower radial bearing surfaces may have a gap between the exterior surface of the shaft and the bearing assemblies of 0.1 to 2 mils, while other portions of the longitudinal surface may have a much wider gap extending, for example, up to 10 mils or more; for example, 2 to 6 mils. This embodiment, therefore, provides for a larger ferrolubricant reservoir to be maintained between the upper and lower radial bearings.

The bearing assembly of the invention is easily manufactured, such as by cold-forming the parts, and is low-cost and is simple in design and construction, and yet provides for a ferrofluid thrust and radial precision bearing assembly, with single, double or multiple bearing surfaces, and also a thrust bearing surface and a radial bearing surface. The bearing assembly, wherein a double bearing is employed, provides for lower energy consumption, because rotation of the spindle is not shearing a thin film for the entire axial length, and, therefore, there is a lower shear rate, where upper and lower radial bearing surfaces are employed. Further, since the ferrofluid exclusion seal is placed at the other end of the housing and about the rotatable shaft, the magnetic flux lines may be concentrated, to prevent the outward movement of the ferrolubricant or the entrainment of gas into the ferrolubricant within the reservoir, while not affecting substantially the viscosity or other physical properties of the ferrolubricant of the radial or thrust bearing. It is desirable to control the magnetic flux lines, since, in flux high-density conditions, the magnetic flux increases the viscosity of the ferrolubricant, and, thus, magnetic flux lines should be avoided where the ferrolubricant is employed at the bearing surfaces.

The ferrofluid seal apparatus employed at the other end of the housing, to retain the ferrolubricant in position and to prevent gas entrainment, typically comprises an annular permanent magnet adapted to surround the other end of the rotatable shaft positioned in the housing, the shaft being formed of a magnetically permeable material, while the housing is typically formed of a nonmagnetic material, such as aluminum, bronze or 300-series stainless steel. The ferrofluid exclusion seal would include at least a single pole piece in a magnetic flux relationship with the permanent magnet and extends annularly generally at one end into a close, noncontacting relationship with the surface of the rotatable shaft, to form a radial gap between the one end and the surface of the shaft, which radial gap may vary typically from 2 to 6 mils. If desired, the ferrofluid seal may comprise a single-stage seal, a dual-stage seal with dual pole pieces or, even where pressure is involved, a multiple-stage, pressure-type ferrofluid exclusion seal apparatus.

For the purpose of illustration only, the invention will be described employing a single-pole-piece ferrofluid seal apparatus having a single, magnetically permeable pole piece and an annular permanent magnet, and with one end of the pole piece extending into a close relationship with the surface of the shaft to define a radial gap, and with the ferrolubricant from the reservoir disposed in the radial gap to provide an exclusion seal. The magnetic flux path of the single-stage or single-pole-piece-seal extends through the permanent magnet, the single pole piece, the ferrofluid in the radial gap and the shaft element to be sealed, and typically an air gap between the shaft element and the other end of the annular permanent magnet with generally the radial of the pole piece gap being less than the length of the gap. The single-pole-piece ferrofluid seal employed in the bearing assembly is particularly useful where space is at a premium, and where magnetic flux is desired to be concentrated in the radial gap and not to be distributed over a wider area. A single-stage ferrofluid seal is described in U.S. patent application Ser. No. 450,339, filed Dec. 16, 1982 (now U.S. Pat. No. 4,407,508, issued Oct. 4, 1983).

The ferrofluid employed in the bearing assembly typically comprises a ferrofluid which acts both as a seal and as a lubricant and is also known as a ferrolubricant. Generally, the ferrolubricant comprises a nonvolatile carrier liquid in which the magnetic particles are colloidally dispersed. Generally, the ferrolubricant would comprise a hydrocarbon-based or ester-based, nonvolatile, low-vapor-pressure, liquid carrier. Generally, the ferrolubricant employed may vary in viscosity, magnetic saturation and composition, but typically the ferrolubricant has a low viscosity, such as a viscosity generally less than about 100 cps at 27° C., and a low magnetic saturation generally less than about 300 gauss, such as, for example, in the range of 100 to about 200 gauss.

The invention will be described for the purpose of illustration only in connection with certain embodiments; however, it is recognized that various changes, modifications and additions may be made to the described embodiments, all falling within the spirit and scope of the invention.

DESCRIPTION OF THE EMBODIMENTS

Figure 1:
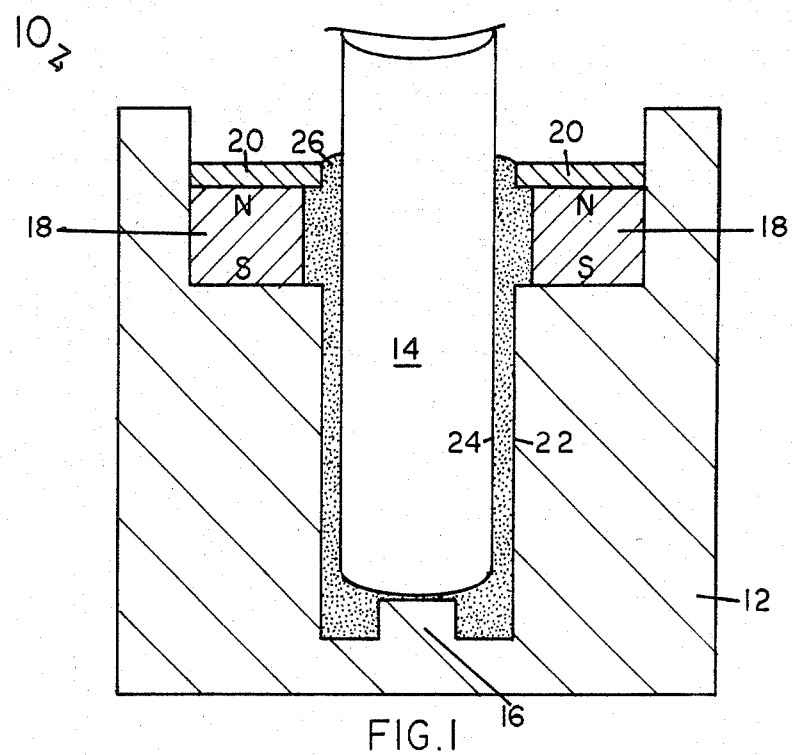
FIG. 1 is an illustrative, sectional view of a ferrofluid thrust and radial film bearing assembly of the invention.

FIG. 1 shows a bearing assembly 10 of the invention which includes a housing 12 typically of a nonmagnetic material, the housing characterized by a generally tubular shaft-receiving space having an inner radial bearing wall surface 22, and at the one end a thrust bearing surface 16, the shaft-receiving space housing a rotatable shaft or spindle 14, such as a computer-disc-drive spindle. A ferrolubricant 26 is in the shaft-receiving space, and a ferrofluid single-stage, single-pole-piece exclusion seal is mounted at the upper portion of the cavity and comprises an annular permanent magnet 18 and an annular single pole piece 20, one end of which extends into a close, noncontacting relationship with the surface of the shaft 14 to form a radial gap, wherein the ferrofluid 26 is retained in the radial gap by the concentrated magnetic flux lines in the gap. In the bearing assembly 10, the radial gap is approximately 2 to 3 mils, while the radial bearing surface is spaced apart from the surface of the shaft by approximately 1 mil. The ferrolubricant comprises a diester, nonvolatile ferrolubricant having a viscosity of 80 cps at 27° C., and having a magnetic saturation of 100 to 200 gauss.

In operation, the precision, rotatable spindle 14 is supported on a thin liquid film on the thrust bearing surface 16 and within the tubular radial bearing surface 22 which extends upwardly toward the ferrofluid exclusion seal comprising the magnet 18 and the pole piece 20. The exclusion seal at the other end, by entrapment of the ferrolubricant 26 in the radial gap, prevents the escape of the ferrolubricant from the shaft-receiving space. Thus, the ferrolubricant may serve as a reservoir therein. The ferrolubricant 26 extends as a reservoir on either side of the generally radial or cylindrical thrust bearing surface 16 and also an annular ring about the annular magnet 18 as a thin film along the radial bearing surface 22.

Figure 2:
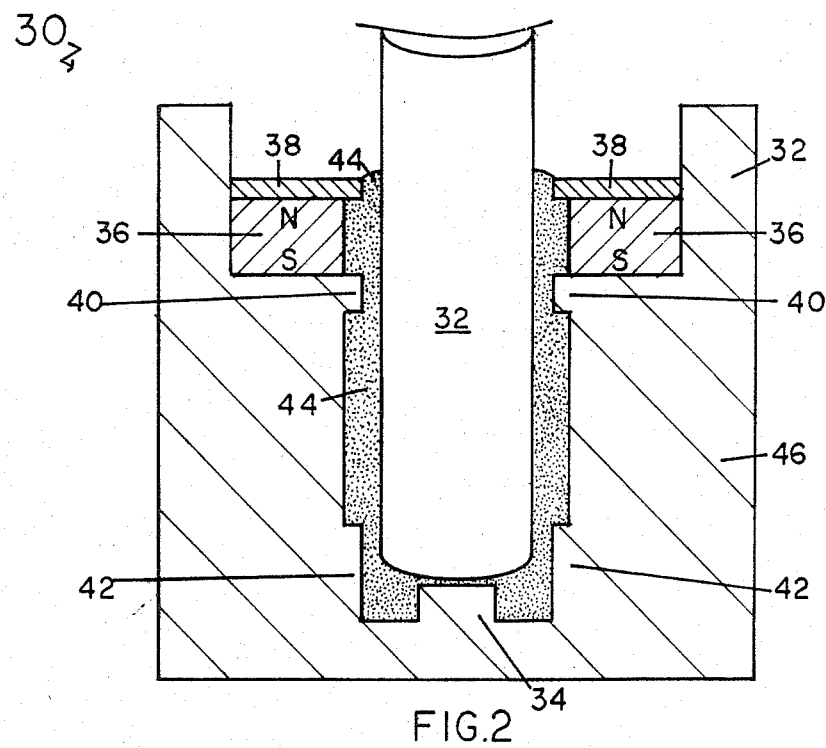
FIG. 2 is an illustrative, sectional view of a modified, upper and lower radial bearing assembly of the invention.

FIG. 2 shows a bearing assembly 30 characterized by a shaft-receiving space so formed to define an upper radial bearing 40 and a lower radial bearing surface 42, both of the bearing surfaces in a close relationship with the surface of the shaft 32, such as about 1 mil. The housing 46, in which the shaft-receiving space is formed, includes a raised, cylindrical, dome-like thrust bearing projection surface 34, to provide support for the shaft 32. A tubular cavity between the upper 40 and the lower 42 radial bearing surfaces provides for a reservoir of ferrolubricant 46 therein, and generally has a greater thickness than diameter the shaft 32, such as, for example, as much as 100 mils; for example, up to 50 mils, depending on the amount of ferrolubricant desired in the reservoir. At the other end of the cavity, there is a ferrofluid exclusion seal of a single-stage, single-pole-piece-type seal which comprises an annular magnet 36 and an annular pole piece 38 which forms a radial gap with the surface of the shaft 32, and wherein the ferrofluid 44 is retained in the gap by the magnetic flux. In operation, the bearing assembly 30 reduces the amount of ferrolubricant sheared by the placing of two small bearings; that is, the upper and lower bearing surfaces, which may vary in longitudinal length, and in closeness to the surface of the shaft, while the intervening tubular reservoir of ferrolubricant 44 is retained within the cavity by the use of the single-stage exclusion seal at the other end of the cavity and formed by the magnet 36 and the pole piece 38.

If desired, in both FIGS. 1 and 2, the single-stage ferrofluid exclusion seal apparatus may include another pole piece on the opposite side of the permanent magnet in the first pole piece, to make a dual exclusion seal magnet, and spread the magnetic flux lines over and between the pole pieces. Further, if desired, the housing may be made of a magnetically permeable material, where the ferrofluid exclusion seal apparatus is surrounded by a nonmagnetic housing, such as an L-shaped aluminum housing, which would shield the pole piece and permanent magnet from the magnetically permeable housing.

The bearing assembly of the invention, as illustrated, provides for a simple, low-cost, yet effective high precision thrust and radial bearing assembly particularly useful for low-or high-speed precision spindle shafts, while preventing the escape of ferrolubricant from the bearing assembly and reducing the tendency of the ferrolubricant to entrap and entrain gases therein, while also reducing the detrimental effects of magnetic flux on the ferrolubricant.

What is claimed is:

1. A ferrolubricant thrust and radial bearing assembly for a shaft which comprises:
   (a) a housing characterized by a generally elongated cylindrical shaft-receiving cavity having a one and another end, and the housing having a radial bearing surface and having at the one end of the cavity a thrust bearing surface;
   (b) a magnetically permeable shaft element in the shaft-receiving cavity, one end of the shaft supported by the thrust bearing surface and the other end of the shaft extending from the other end of the cavity, the surface of the shaft forming a close, noncontacting relationship with the radial bearing surfaces;
   (c) ferrolubricant in the cavity, to provide lubrication to the thrust and radial bearing surfaces, and the ferrolubricant extending to the other end of the cavity and wherein the ferrolubricant has a viscosity of less than about 100 cps at 27° C. and a magnetic saturation of less than about 300 gauss; and
   (d) a ferrolubricant seal apparatus means to form a ferrolubricant seal about the surface of the shaft at the other end of the elongated cavity, to prevent, during rotation of the shaft, the escape of ferrolubricant from the cavity and the entrapment of gases in the ferrolubricant.

2. The bearing assembly of claim 1 wherein the ferrofluid seal apparatus means comprises an annular permanent magnet disposed about the other end of the shaft and at least one annular pole piece about the shaft and in a magnetic flux relationship with the permanent magnet, with one end of the pole piece forming a radial gap with the surface of the shaft, and the ferrolubricant retained as a ferrolubricant seal in the radial gap by the magnetic flux across the radial gap.

3. The bearing assembly of claim 2 wherein the ferrofluid seal apparatus comprises a single pole piece, which pole piece is adjacent the permanent magnet within the housing and forms a single ferrolubricant seal about the shaft.

4. The bearing assembly of claim 2 wherein the one end of the pole piece extends into a closer distance with the surface of the shaft than the permanent magnet, and the intervening space comprises a ring of ferrolubricant.

5. The bearing assembly of claim 1 wherein the radial bearing surface comprises a single radial bearing surface which extends along a substantial length of the surface of the shaft from the one to the other ends.

6. The bearing assembly of claim 1 wherein the thrust bearing surface comprises a centrally disposed, raised surface element at the one end of the cavity, having a diameter less than the diameter of the cavity.

7. The bearing assembly of claim 1 wherein the distance between the radial bearing surface and the surface of the shaft ranges from about 0.1 to 2 mils.

8. The bearing assembly of claim 7 wherein the radial gap of the ferrolubricant seal apparatus means ranges from about 2 to 6 mils.

9. The bearing assembly of claim 1 wherein the shaft comprises a computer-disc-drive-spindle shaft.

10. The bearing assembly of claim 1 which includes spatially separated, upper and lower, radial bearing surfaces, the upper surface generally adjacent the ferrolubricant seal apparatus means and the lower surface generally adjacent the thrust bearing surface.

11. The bearing assembly of claim 10 wherein the cavity between the upper and lower radial bearing surfaces is generally tubular and of greater diameter than the radial bearing surface, and comprises a reservoir of ferrolubricant for the bearing surfaces.

12. The bearing assembly of claim 11, wherein the distance between the upper and lower radial bearing surfaces and the surface of the shaft ranges from about 0.1 to 2 mils.

13. A ferrolubricant thrust and radial bearing assembly for a shaft which comprises:
   (a) a housing characterized by a generally elongated cylindrical shaft-receiving cavity having a one end and a closed other end, the housing defining a cylindrical radial bearing surface extending from the one to the other end and having at the one closed end a central, raised, thrust bearing surface;

(b) a magnetically permeable shaft element in the shaft-receiving cavity, one end of the shaft supported by the thrust bearing surface and the other end of the shaft extending from the other end of the cavity, the surface of the shaft in a close, noncontacting relationship with the radial bearing surface, to permit the precision rotation of the shaft in the cavity;

(c) ferrolubricant in the cavity, to provide lubrication to the thrust and radial bearing surfaces, and wherein the ferrolubricant has a viscosity of less than about 100 cps at 27° C. and a magnetic saturation of less than about 300 gauss; and (d) a ferrolubricant seal apparatus means to form a ferrolubricant seal at the other end of the cavity about the shaft, which seal means comprises an annular permanent magnet about the shaft and a single pole piece adjacent the permanent magnet and positioned toward the other end, one end of the pole piece forming a radial gap with the surface of the shaft, to retain ferrolubricant in the radial gap with the ferrolubricant forming an enlarged diameter sealing ring of the ferrolubricant between the shaft and the permanent magnet.

14. A ferrolubricant thrust and radial bearing assembly for a shaft which comprises:

(a) a housing characterized by a shaft-receiving cavity having a one open end and another closed end, the cavity defining an upper radial bearing surface adjacent the one open end and a lower radial bearing surface adjacent the other closed end, the cavity between the upper and lower radial surfaces having an enlarged diameter cavity, and the cavity having at the other closed end a central, raised, thrust bearing surface;

(b) a magnetically permeable shaft element in the shaft-receiving cavity, one end of the shaft supported by the thrust bearing surface and the other end of the shaft extending beyond the radial bearing surface, the surface of the shaft in a close, non-contacting relationship with the radial bearing surface, to permit the precision rotation of the shaft in the cavity;

(c) ferrolubricant in the cavity, to provide lubrication to the thrust and radial bearing surfaces; and (d) a ferrolubricant seal apparatus means to form a ferrolubricant seal at the other end of the cavity about the shaft, which seal means comprises an annular permanent magnet about the shaft and a single pole piece adjacent the permanent magnet, one end of the pole piece forming a radial gap with the surface of the shaft, to retain ferrolubricant in the radial gap, with the ferrolubricant forming an enlarged diameter ring of ferrolubricant between the shaft and the permanent magnet, thereby forming a low-energy-consuming thrust and radial bearing assembly.

15. The bearing assembly of claim 14 wherein the distance between the upper and lower radial bearing surfaces and the surface of the shaft ranges from about 0.1 to 2 mils, and the radial gap of the ferrofluid seal apparatus means ranges from about 2 to 6 mils.

* * * * *